Aug. 4, 1936.    G. A. RITCHIE    2,049,665
COOKER
Filed Dec. 31, 1935
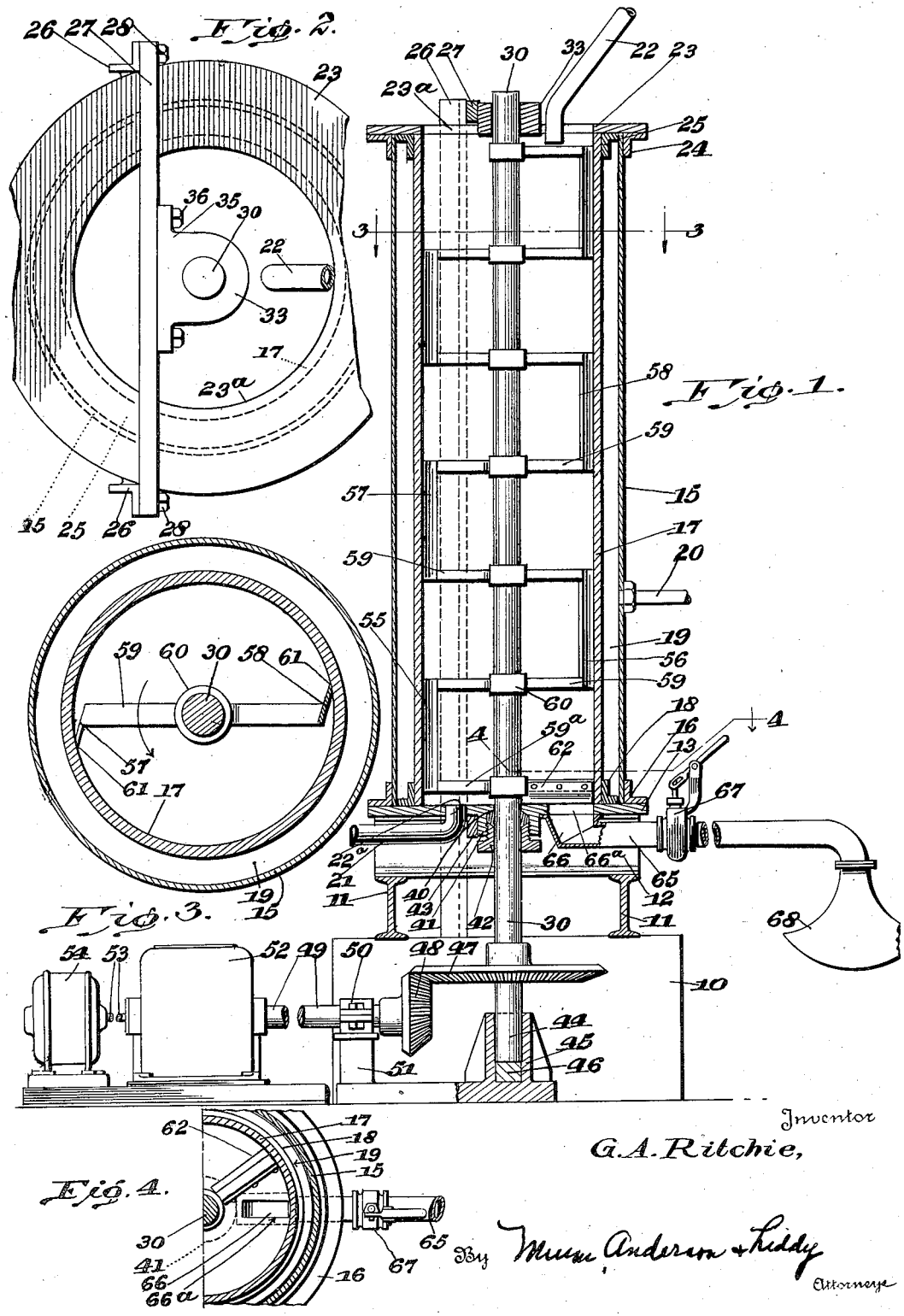
Inventor
G. A. Ritchie,
By Munn, Anderson & Liddy
Attorneys Patented Aug. 4, 1936

2,049,665

UNITED STATES PATENT OFFICE 2,049,665

COOKER

George A. Ritchie, Bogota, Colombia

Application December 31, 1935, Serial No. 57,072

1 Claim. (Cl. 53—17)

This invention relates to cookers.

An object of the invention is the provision of a vertical cooker having an outer shell spaced from an inner shell to provide a steam chamber between the shells, a shaft being mounted axially of the inner shell and provided with a plurality of scrapers arranged in staggered relation for removing materials from the inner wall of the inner shell in a progressive manner, a horizontal scraper being operated by the shaft for moving over a common bottom for said shells.

Another object of the invention is the provision of a pair of steel shells concentrically disposed and spaced from each other to provide a steam chamber between the outer wall of the inner shell and the inner wall of the outer shell, a shaft being disposed axially of the inner shell and equipped with a plurality of staggered scrapers arranged in a vertical plane with alternate scrapers being diametrically disposed, the arrangement of the scrapers being such that the material is progressively removed from the side walls of the inner shell so that other material may come in contact with the heated walls during the cooking process, the shaft projecting below the single bottom of the shells and steam chamber and operatively connected with means causing rotation of the shaft.

A further object of the invention is the provision of a cooker for materials which is composed of a pair of concentrically disposed shells spaced sufficiently from each other to provide a steam chamber, the shells being provided with a common rigid bottom portion through which projects a pipe for supplying materials to be cooked in the inner shell, means being employed within the shell for progressively removing the materials from the walls of the inner shell, a discharge conduit leading from a discharge trough in the bottom for conducting the cooked materials when desired to a flattened discharge spout so that when cars are moved below said discharge spout the materials will be emptied into the cars over the entire width thereof.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a vertical section of a cooker constructed in accordance with the principles of my invention, Figure 2 is a fragmentary plan view of the same, Figure 3 is a horizontal transverse section taken along the line 3—3 of Figure 1, and Figure 4 is a detail section taken on the line 4—4 of Fig. 1, especially showing the trough opening in the bottom plate.

Referring more particularly to the drawing, 10 designates a foundation which may be formed of concrete and reinforced by steel in a well known manner. The foundation is adapted to support a pair of parallel I-beams 11 upon which are mounted I-beams 12 located at right angles to the I-beams 11.

A base member for the cooker is shown at 13 and this base member is secured to the I-beams 12 in any approved manner.

An outer shell 15 of circular cross section is connected to the base member 13 by a flanged ring 16. An inner shell 17 which is circular in cross section and disposed concentrically within the shell 15 is also secured to the base member 13 by means of a flanged ring 18. An annular space 19 which is formed between the inner and outer shells provides a steam chamber which is supplied with steam through a pipe 20. It will be noted that the walls of the inner shell 17 are of greater thickness than the walls of the outer shell. A feed pipe 21 for material to be cooked has an inlet end 22$^a$ projecting through the base member 13 and opens into the inner shell 17. Another feed pipe 22 for supplying the inner shell with material to be cooked is located at the top of the inner shell and projects through a central opening 23$^a$ in a ring 23 which is sealed to the upper end of the inner and outer shell. The base member 13 and the ring 23 form the opposite closed ends of the steam chamber 19. The material to be cooked may be fed either through the pipe 21 or through the pipe 22 or at times these pipes may alternately feed the materials to the inner shell. The base member 13 forms a common bottom for the two shells.

A flanged ring 24 is secured to the outer upper end of the outer shell 15 and a flanged ring 25 is secured to the upper end of the inner shell 17. These flanged rings form a support upon which the ring 23 rests. It will be noted that the upper inner free end of the inner shell coincides with the inner periphery of the ring 23 so that a scraping mechanism within the inner shell may be readily removed when desired.

A pair of angle irons 26 are securely fixed in the foundation 10 and extend upwardly along the outer wall of the outer shell 15. A bar 27 is removably connected at 28 to the angle irons 26. This bar acts as a means for maintaining the ring 23 in position and for supporting a bearing for a shaft to be presently described.

A shaft 30 extends axially of the inner shell 17 and has its upper end projecting through a bearing 33. Said bearing is formed integrally with the bar 27 or welded to the same so that by the removal of the bar the bearing is also removed.

The lower end of the shaft 30 projects through an opening 40 in the base member 13 and this base member is provided with an internally threaded boss 41 to receive a packing gland 42. A bracket 43 is connected to the boss 41 and is supported by the angle irons 26.

The lower end of the shaft 30, as shown at 44, is mounted in a bearing 45 carrying a lignite block 46 upon which the shaft rests. Means (not shown) is employed for lubricating the lower end of the shaft.

A gear 47 is secured to the lower end of the shaft 30 and meshes with a gear 48 carried by a shaft 49 which is mounted in a bearing 50 on a standard 51.

The shaft 49 is connected with a speed reducer, generally designated by the numeral 52, of a well known type. A shaft 53 of the speed reducer is driven by an electric motor 54.

A plurality of scrapers 55, 56, 57 and 58 are secured to the ends of spokes 59 which are carried by hubs 60 secured to the shaft 30 and it will be noted that these scrapers are disposed in staggered relation in the inner shell. The scraper 55 is secured to the ends of a pair of the spokes 59 and 59a while the scraper 56 is diametrically located to the scraper 55 and secured to the ends of a pair of spokes but in a higher plane than the scraper 55. The other scrapers are located in ascending planes and in a diametrically opposed manner so that the work of scraping is distributed along the shaft. In other words, a certain number of scrapers are diametrically disposed with the other scrapers but in alternate planes.

The scrapers are disposed at an obtuse angle to a plane passing through the supporting spokes and the outer free edge of the scraper, as shown at 61, conforms to the curvature of the inner wall of the inner shell 17. Therefore, the free edges of these scrapers are sheared off so that they will scrape the material being cooked from the inner wall of the inner shell 17 and prevent burning or excessive cooking at these points.

A scraper 62 is secured in a horizontal position to the lowermost spoke 59a so that it will scrape over the bottom 13 for forcing the material into a trough 66. This scraper will clean the bottom when a batch of material has been removed from the cooker.

A discharge pipe 65 has its inner end opening into the trough 66 formed at the bottom of the base member 13 and this trough is in alignment with an opening 66a in said base member and is in communication with the inner shell 17. This discharge pipe is provided with a valve 67 for releasing the cooked material to a chute or spout 68. It will be noted that this spout has its free open end extended for considerable length so that when cars are moved beneath the spout the materials will be delivered in a wide stream substantially the width of the car.

The load will be pumped through either pipe 22 or pipe 21 or alternately through these pipes through an electrically driven sludge pump (not shown).

The scrapers are moved at a predetermined speed so that the materials being cooked are scraped from the inner wall of the shell to move the superheated materials away from the walls so that the lesser heated materials may come into contact with the hotter regions of the shell 17.

The lowermost member 62 scrapes the material off the inner face of the bottom 13 into the trough through the opening 66a during normal operation and when the batch of cooked material is removed from the cooker, the member 62 scrapes the bottom clean to prevent the possibility of bacterial infection in any material which would be otherwise left on said bottom.

While various materials may be cooked in the device it is preferably used for cooking corn meal which is discharged into molds (not shown) from the discharge member 68 and wrapped in sealed packages for sale in stores.

It will be appreciated that the outer shell 15 works under tension while the inner shell works under compression.

I claim:

A cooker comprising a cylindrical outer shell, an inner shell having its walls of greater thickness than the outer shell and disposed concentrically within the outer shell, the space between the inner and outer shells providing a steam chamber, a shaft located axially of the inner shell, a top cover for the space between the shells, a base member closing the bottoms of the said shells, bearings for the shaft supported adjacent the top and bottom, angle irons disposed upon opposite sides of the outer shell, bars connected between the angle irons and secured to the bearings, and scrapers supported by the shaft within the inner shell.

GEORGE ALEX. RITCHIE.